US010363879B1

(12) United States Patent
Hoye

(10) Patent No.: US 10,363,879 B1
(45) Date of Patent: Jul. 30, 2019

(54) VEHICLE DASHBOARD DESK

(71) Applicant: Mary Ellen Hoye, Homer Glen, IL (US)

(72) Inventor: Mary Ellen Hoye, Homer Glen, IL (US)

( * ) Notice: Subject to any disclaimer, the term of this patent is extended or adjusted under 35 U.S.C. 154(b) by 0 days.

(21) Appl. No.: 15/959,257

(22) Filed: Apr. 22, 2018

(51) Int. Cl.
*B60R 7/06* (2006.01)
*A47B 1/00* (2006.01)
*B60R 11/00* (2006.01)

(52) U.S. Cl.
CPC .................... *B60R 7/06* (2013.01); *A47B 1/00* (2013.01); *B60R 2011/005* (2013.01)

(58) Field of Classification Search
CPC ....... B60R 7/06; B60R 2011/005; A47B 1/00; A47B 17/00
USPC ................. D12/415, 426; 224/483
See application file for complete search history.

(56) References Cited

U.S. PATENT DOCUMENTS

| | | | | |
|---|---|---|---|---|
| 2,494,980 A | | 7/1947 | Zuckerman | |
| 3,476,257 A | * | 11/1969 | O'Connell | B60R 7/08 211/126.1 |
| 3,741,450 A | * | 6/1973 | Seastrom | B60R 7/06 224/483 |
| 3,873,010 A | * | 3/1975 | Patterson | B60N 3/103 206/216 |
| 3,909,092 A | * | 9/1975 | Kiernan | B60R 7/043 220/505 |
| 4,118,084 A | * | 10/1978 | Sussman | A47B 87/02 108/53.5 |
| 4,231,625 A | * | 11/1980 | Perez | G11B 23/0236 206/387.15 |
| D264,894 S | * | 6/1982 | Halder | D12/426 |
| 4,577,788 A | * | 3/1986 | Richardson | B43M 99/008 108/44 |
| 4,619,386 A | * | 10/1986 | Richardson | B60R 7/06 108/44 |
| 4,643,280 A | * | 2/1987 | Hensley | A45C 3/02 108/44 |
| 4,693,382 A | * | 9/1987 | Galen | A47B 57/58 211/184 |
| 4,717,193 A | | 1/1988 | Noriega | |
| 4,846,382 A | * | 7/1989 | Foultner | B60R 11/00 224/483 |
| 5,505,139 A | * | 4/1996 | Storholm | B60N 3/001 108/44 |
| D649,807 S | * | 12/2011 | Stoepker | D6/675 |

(Continued)

FOREIGN PATENT DOCUMENTS

WO   WO-9002061 A1 *  3/1990  ............. B60R 7/06

*Primary Examiner* — Justin M Larson
(74) *Attorney, Agent, or Firm* — Clifford H. Kraft

(57) ABSTRACT

A dashboard desk organizer fits on the dashboard of a vehicle providing compartments for storage. Its top and bottom can be made from a semi-stiff rubber or polymer product that, while partially stiff, can nevertheless be contoured to match the contours of the dashboards of different vehicles. The structure can be around four to five inches high with a lower lip of about an inch to keep items from sliding out. It can be from about nine to eleven inches deep with varying standard manufactured lengths sized to fit a wide range of dashboards. Alternatively, its compartments can be slanted downward in the forward direction to prevent slip out of items rather than having a lip.

8 Claims, 3 Drawing Sheets

(56) References Cited

U.S. PATENT DOCUMENTS

| | | | |
|---|---|---|---|
| 8,490,846 B1* | 7/2013 | Wheatley | B60R 11/02 |
| | | | 224/277 |
| 2002/0163218 A1 | 7/2002 | Stubbings et al. | |
| 2004/0084492 A1* | 5/2004 | Wheatley | B60R 7/02 |
| | | | 224/483 |
| 2005/0199668 A1* | 9/2005 | Wheatley | B60R 11/00 |
| | | | 224/483 |

* cited by examiner

VEHICLE DASHBOARD DESK

BACKGROUND

Field of the Invention

The present invention relates generally to vehicle accessories and more particularly to a removable vehicle dashboard desk.

Description of the Prior Art

It is well known that the dashboard of an automobile or other vehicle is extremely unsuited for placing loose objects such as keys or cellphones. Most people have experienced their cellphone or other item sliding left or right across the dashboard while the vehicle is negotiating a turn, or jumping off when the vehicle accelerates. Many times the item is pushed totally off the dashboard due to the intrinsic forces induced when a vehicle makes a turn or suddenly accelerates. The only reasonable alternative is the glove compartment which quickly becomes cluttered with items and is simply not suited for storing things that may be needed. It would be extremely advantageous to have a removable low-profile dashboard desk that would hold loose items from movement or spilling but would not obstruct vision.

There have been some attempts to solve this problem in the past. Noriega in U.S. Pat. No. 4,717,193 teaches a shelf for a vehicle cab that is above the windshield level. Stubblings describes a vehicle shelf in U.S. Published application number 2002/016,3218. Zuckerman in U.S. Pat. No. 2,494,980 shows a flat depressed tray that sits on top of a dashboard.

None of these inventions adequately solve the problem of keeping items separated in segmented compartments while holding them.

SUMMARY OF THE INVENTION

The dashboard desk organizer of the present invention is a flexible compartment that fits on the dashboard of a vehicle. Its top and bottom can be made from a semi-rigid rubber or polymer product that, while partially stiff, can nevertheless be contoured to match the contours of the dashboards of different vehicles. The structure can be around four to five inches high with a lower lip to keep items from sliding out. It can be from about nine to eleven inches deep with varying standard manufactured widths sized to fit a wide range of dashboards. Alternatively, its compartments can be slanted downward in the forward direction to prevent slip out of items. This embodiment avoids the lower lip yielding larger openings.

An example of an embodiment of the present invention is a vehicle dashboard desk that includes a semi-rigid bottom member constructed to partially extend across a vehicle dashboard; the bottom member is flexible enough to be made to conform with the dashboard upper surface, A semi-rigid top member constructed to rest above the bottom member and conform to the shape of the bottom member can form a top of the unit. Several vertical slats or sides insertable or attached between the bottom member and the top member form a series of compartments. There can be a lip attached to the bottom member extending the length of the bottom member to keep items from slipping out.

DESCRIPTION OF THE FIGURES

Attention is now directed toward several figures that illustrate features of the present invention.

Several drawings and illustrations have been presented to aid in understanding the present invention. The scope of the present invention is not limited to what is shown in the figures.

DESCRIPTION OF THE PREFERRED EMBODIMENTS

The dashboard desk organizer of the present invention is a shelf structure that can be made from a semi-rigid rubber or polymer rubber-like product (for example, similar to the material used for dish drainage mats). It is rigid enough to maintain its shape, yet flexible enough to be made to match the curves and contours of a dashboard top surface. There are compartments for a cellphone, letters, papers, books, pad device or the like. There can also be optional buttons or hooks on the front of the bottom member where accessory holders can be attached. These can hold cellphone, keys, letters and the like.

The structure can be around 4-5 inches high with a lower lip of about 1 inch to keep items from sliding out. It can be from about 9 to 11 inches deep with varying standard manufactured lengths sized to fit a wide range of dashboards. It can be made, for example with widths of 2-3 feet. In some embodiments there can be multiple units, for example two 2 foot units side-by-side, or alternatively a single 2 foot or 3 foot unit.

Figure 1:
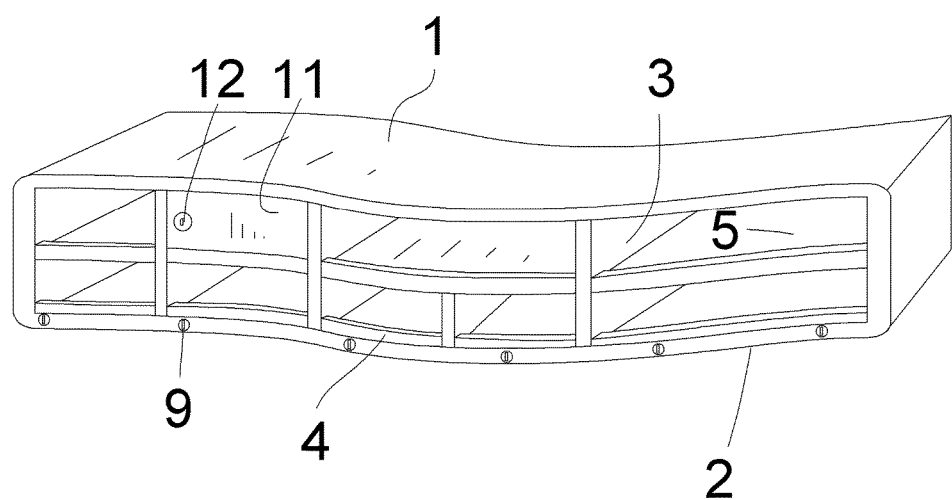
FIG. 1 shows a front view of an embodiment of the present invention.
Figure 2:
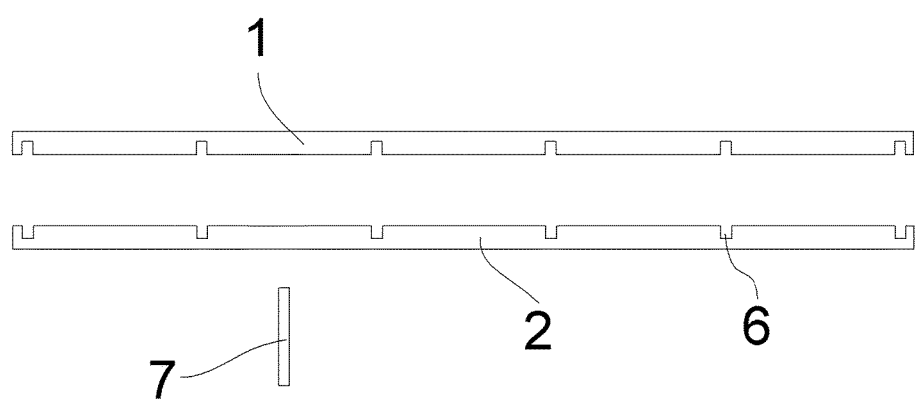
FIG. 2 shows a front view of the top and bottom portions.

FIG. 1 shows a front view of an embodiment of the present invention. There is a top 1 and a bottom 2. A series of vertical insets 3 form a set of compartments with there being one or two levels of compartments in different embodiments. In a particular embodiment, a lip 4 runs across the lower face to keep items from slipping out, especially during rapid accelerations. FIG. 2 shows just the top 1 and bottom 2 members contoured to match a particular dashboard.

The bottom member should be flexible enough to be made to conform to the contours of the top of the dashboard. The conformation process can be performed as the unit is installed. The top member can typically have the same shape as the bottom member; however, in some embodiments, it may have a different shape. The vertical slats can be permanently attached or insertable.

Figure 3:
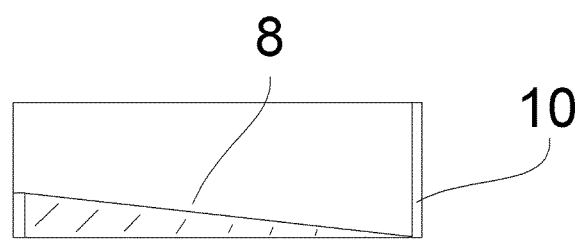
FIG. 3 shows a cross-section of an alternative embodiment with slanted shelves.

An alternate embodiment of the invention does not use a lip, but rather slants the shelves downward in a forward direction. This downward slant serves to keep items from slipping out without a lip. FIG. 3 shows a cross-section clearly depicting the slant of the bottom member 2. This has the advantage of slightly larger openings.

As stated, the present invention is typically between two and three feet wide with different stock sizes available to fit on the passenger side of most vehicle dashboards. In some vehicles, a driver's side shelf may be added or may be used (usually of one level in order to not restrict visibility). This may or may not be connected to the passenger side shelf.

Embodiments of the present invention can have some of the compartments equipped with covers that close, and in some cases even lock. This can assure safety and privacy for items like keys without them being visible from outside the vehicle.

Another embodiment uses the dashboard top surface as a lower holding surface rather than having a bottom member.

This embodiment simply provides vertical shelf slats or sides and a flat top, or a flexible top that can conform to the tops of the slats.

Finally, all the members of the present invention including the top member, bottom member and slats can be supplied in different colors to match the vehicle's interior or paint, or for designer purposes.

In summary, the present invention is a useful vehicle shelf that can be used to hold items like a cellphone, keys, cards, toll road pass devices, papers, children's belongings. It is a flexible compartment with either pre-set spaces or customizable spaces to fit the user's needs or the vehicle dashboard shape and space.

Several descriptions and illustrations have been provided to aid in understanding the present invention. One with skill in the art will realize that numerous changes and variations may be made without departing from the spirit of the invention. Each of these changes and variations is within the scope of the present invention.

I claim:

1. A vehicle dashboard desk comprising:
   a semi-rigid bottom member constructed to partially extend across a vehicle dashboard, the bottom member flexible enough to be made to conform with the dashboard upper surface, and to rest on it;
   a semi-rigid top member constructed to rest above the bottom member and conform to the shape of the bottom member;
   a plurality of vertical slats insertable or attached between the bottom member and the top member forming a series of compartments;
   a lip attached to the bottom member, the lip extending the length of the bottom member;
   whereby, items can be stored in the compartments with the lip preventing said items from slipping out.

2. The vehicle dashboard desk of claim 1 wherein the bottom member is a semi-rigid but flexible rubber or polymer material.

3. The vehicle dashboard desk of claim 1 further comprising one or more horizontal inserts creating at least two selves in one or more of the compartments.

4. The vehicle dashboard desk of claim 1 further comprising a plurality of buttons or hooks attached to the bottom member.

5. The vehicle dashboard desk of claim 4 wherein the buttons or hooks are constructed to hold items.

6. The vehicle dashboard desk of claim 1 wherein the top and bottom members and the vertical slats are supplied in different colors.

7. The vehicle dashboard desk of claim 1 further comprising at least one compartment having a cover.

8. The vehicle dashboard desk of claim 7 wherein said compartment having a cover also has a lock.

* * * * *